United States Patent Office 3,294,824
Patented Dec. 27, 1966

3,294,824
3α-ALKOXY-6β-METHYL-5α-ANDROSTAN-17-ONES
AND DERIVATIVES THEREOF
Paul D. Klimstra, Northbrook, Ill., assignor to G. D. Searle & Co., Chicago, Ill., a corporation of Delaware
No Drawing. Filed Jan. 15, 1965, Ser. No. 425,931
7 Claims. (Cl. 260—397.5)

The present invention is concerned with novel steroidal derivatives characterized by a 6-methyl group and, more particularly, with 3α-alkoxy-6β-methyl-5α-androstan-17-ones and derivatives thereof. These substances can be represented by the following structural formula

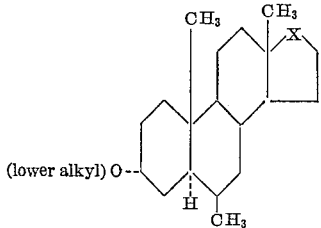

wherein X is a carbonyl, β-hydroxymethylene, β-(lower alkanoyl)oxymethylene, or α-(lower alkyl)-β-hydroxymethylene group.

The term "lower alkyl" designates those radicals represented by the formula $$C_nH_{2n+1}$$

wherein $n$ is less than 8 and are exemplified by methyl, ethyl, propyl, butyl, pentyl, hexyl, heptyl, and the branched-chain isomers thereof. Similarly, the lower alkanoyl radicals encompassed by the foregoing formula are those represented by the following formula

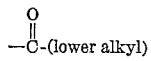

Manufacture of the instant compounds proceeds conveniently by the utilization as starting materials of compounds represented by the following formula

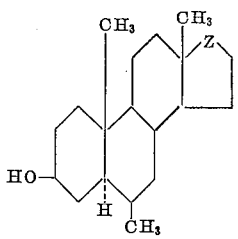

In the latter representation Z can be a carbonyl, β-(lower alkanoyl)oxymethylene or α-(lower alkyl)-β-hydroxymethylene group. Thus, the 3-hydroxy group of those starting materials is acylated by reaction with p-toluenesulfonyl chloride in the presence of a suitable alkaline catalyst such as pyridine to afford the corresponding 3-p-toluenesulfonate. Reaction of such an ester with a lower alkanol results in cleavage of the ester function and formation of the instant 3-alkoxy compound. A specific example of that procedure is the reaction of 6β-methyl-3β-p-toluenesulfonyloxy-5α-androstan-17-one with methanol at the reflux temperature to produce 3α-methoxy-6β-methyl-5α-androstan-17-one.

The 17-hydroxy compounds of the present invention are obtained by contacting the instant 17-keto substances with a suitable metallic reducing agent such as sodium borohydride, lithium aluminum hydride, or lithium tri-(tertiary-butoxy) aluminum hydride. The aforementioned 3α-methoxy-6β-methyl-5α-androstan-17-one, for example, is allowed to react at room temperature with sodium borohydride in aqueous isopropyly alcohol for about 3 hours, thus resulting in 3α-methoxy-6β-methyl-5α-androstan-17β-ol.

An alternate procedure for preparation of the 17β-(lower alkanoyl)oxy compounds of the present invention involves acylation, typically with a lower alkanoic acid anhydride or halide, of the corresponding 17-hydroxy substance. By that method 3α-methoxy-6β-methyl-5α-androstan-17β-ol is contacted with acetic anhydride in the presence of pyridine to yield the coresponding 17-acetate.

The instant 17-alkylated derivatives are obtained alternatively by reaction of the corresponding 17-keto substances with an alkyl organometallic reagent. Alkyl magnesium halides and lithium alkyls are particularly suitable. The aforementioned 3α-methoxy-6β-methyl-5α-androstan-17-one is thus heated with methyl magnesium bromide in ether solution, and the resulting adduct is decomposed with hydrochloric acid, thus yielding 3α-methoxy-6β,17α-dimethyl-5α-androstan-17β-ol.

The compounds of the present invention display valuable pharmacological properties. They are, for example, potent hypocholesterolemic agents and possess the particular advantages of being devoid of the androgenic and anti-estrogenic side-effects characteristic of related prior art compounds adapted for that purpose.

The invention will appear more fully from the examples which follow. These examples are set forth by way of illustration only and it will be understood that the invention is not to be construed as limited either in spirit or in scope by the details contained therein as many modifications in materials and methods will be apparent from this disclosure to those skilled in the art. In these examples temperatures are given in degrees centigrade (° C.). Quantities of materials are expressed in parts by weight unless otherwise noted.

Example 1

A solution of 6 parts of 3β-hydroxy-6β-methyl-5α-androstan-17-one and 6 parts of p-toluenesulfonyl chloride in 20 parts of pyridine is allowed to stand at room temperature for about 21 hours. To that reaction mixture are then added 5% hydrochloric acid and chloroform, and the chloroform layer is separated, washed successively with dilute hydrochloric acid, 5% aqueous sodium bicarbonate, and water. The washed organic solution is dried over anhydrous sodium sulfate, and the solvent is removed by distillation under reduced pressure to afford an oily residue. Crystallization of that material from ethyl acetate yields 6β-methyl-3β-p-toluenesulfonyloxy-5α-androstan-17-one, melting at about 169–171° with decomposition.

Example 2

A mixture of 25 parts of 6β-methyl-3β-p-toluenesulfonyloxy-5α-androstan-17-one and 240 parts of methanol is heated at the reflux temperature for about 90 hours, then is allowed to stand at room temperature for about 48 hours. The reaction mixture is concentrated to a small volume under reduced pressure, and the residual material is extracted with ether. The ether layer is separated, washed successively with water and 5% aqueous sodium bicarbonate until neutral, then dried over anhydrous potassium carbonate containing decolorizing carbon and stripped of solvent under reduced pressure. This residual solid crude product is purified by chromatography on silica gel followed by elution with 5% ethyl acetate in benzene. Further purification of the crystalline material isolated from the eluate is effected by recrystallization from hexane to afford pure 3α-methoxy-6β-methyl-5α-androstan-17-one, which melts at about 124–125° and is characterized further by the following structural formula

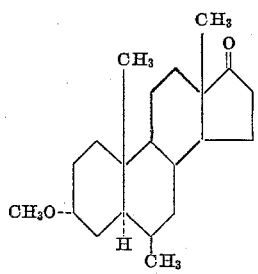

Example 3

By substituting an equivalent quantity of ethanol and otherwise proceeding according to the processes described in Example 2, there is obtained 3α-ethoxy-6β-methyl-5α-androstan-17-one.

Example 4

To a solution of 2 parts of 3α-methoxy-6β-methyl-5α-androstan-17-one in 56 parts of isopropyl alcohol is added a slurry of 2 parts of sodium borohydride with 16 parts of isopropyl alcohol containing 2.8 parts of water. The resulting solution is stirred at room temperature for about 3 hours, then is quenched by pouring into a mixture of ice and water. The resulting precipitate is collected by filtration, washed on the filter with water, and purified by recrystallization from aqueous methanol to afford pure 3α-methoxy-6β-methyl-5α-androstan-17β-ol, melting at about 142–143.5°. It displays an optical rotation, in chloroform, of —11.5° and is characterized further by the following structural formula

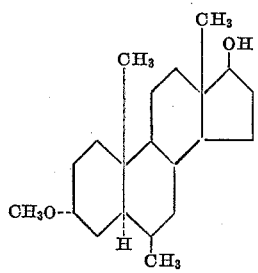

Example 5

A mixture of 5 parts of 3α-methoxy-6β-methyl-5α-androstan-17β-ol, 50 parts of pyridine, and 25 parts of acetic anhydride is kept at room temperature for about 16 hours, then is poured carefully into water. The precipitate which results is collected by filtration, then washed on the filter with water, and dried in air to yield the crude product. Recrystallization of that material from ethanol results in pure 3α-methoxy-6β-methyl-5α-androstan-17β-ol 17-acetate, melting at about 124–125° and displaying an optical rotation, in chloroform, of —13.5°. This compound can be represented by the following structural formula

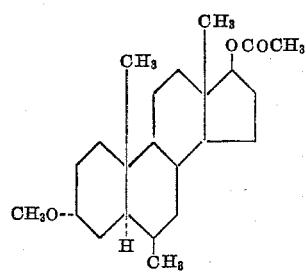

Example 6

The substitution of an equivalent quantity of 3α-ethoxy-6β-methyl-5α-androstan-17-one in the procedure of Example 4 results in 3α-ethoxy-6β-methyl-5α-androstan-17β-ol.

Example 7

The reaction of equivalent quantities of 3α-ethoxy-6β-methyl-5α-androstan-17β-ol and propionic anhydride by the procedure described in Example 5 results in 3α-ethoxy-6β-methyl-5α-androstan-17β-ol 17-propionate.

Example 8

To an ethereal solution, amounting to 45 parts by volume, of 3 M methyl magnesium bromide together with 18 parts of ether is added, over a period of about 15 minutes with stirring, a solution of 2 parts of 3α-methoxy-6β-methyl-5α-androstan-17-one in 18 parts of ether. The reaction mixture is heated at the reflux temperature for about 18 hours, then is carefully poured into a mixture of ice and water, and the resulting aqueous mixture is made acidic by means of hydrochloric acid. The acidic solution is extracted with ether, and the ether layer is separated, washed successively with water and 5% aqueous sodium bicarbonate, then dried over anhydrous sodium sulfate containing decolorizing carbon. Distillation of the solvent at reduced pressure affords a glass-like residue. Purification of that material by recrystallization from hexane affords pure 3α-methoxy-6β,17α-dimethyl-5α-androstan-17β-ol, melting at about 94–96°. This compound can be represented by the following structural formula

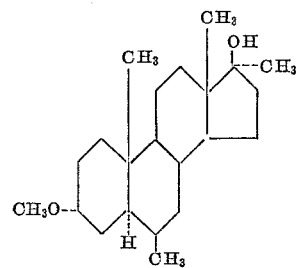

Example 9

By substituting an equivalent quantity of ethyl magnesium bromide and otherwise proceeding according to the processes described in Example 8, there is obtained 17α-ethyl-3α-methoxy-6β-methyl-5α-androstan-17β-ol.

Example 10

The substitution of equivalent quantities of 3α-ethoxy-6β-methyl-5α-androstan-17-one and ethyl magnesium bromide in the procedure of Example 8 results in 3α-ethoxy-17α-ethyl-6β-methyl-5α-androstan-17β-ol.

What is claimed is:
1. A compound of the formula

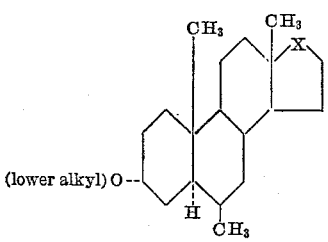

wherein X is a member of the class consisting of β-hydroxymethylene, β-(lower alkanoyl)oxymethylene, and α-(lower alkyl)-β-hydroxymethylene radicals.

2. 3α-methoxy-6β-methyl-5α-androstan-17β-ol.

3. A compound of the formula
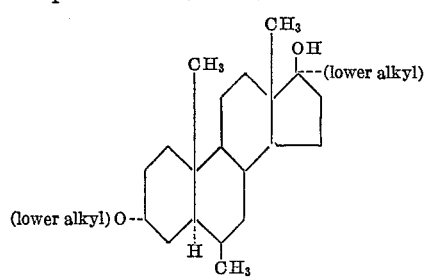
4. A compound of the formula
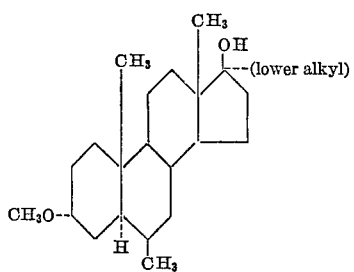
5. 3α-methoxy-6β,17α-dimethyl-5α-androstan-17β-ol.
6. A compound of the formula
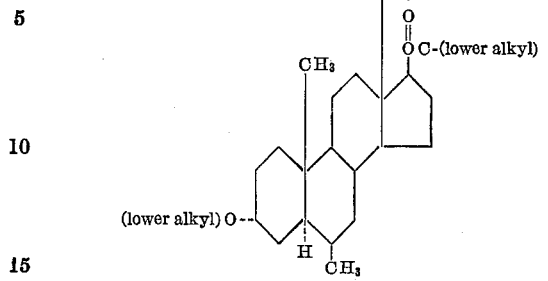
7. 3α - methoxy - 6β - methyl - 5α - androstan - 17β - ol 17-acetate.
References Cited by the Examiner
UNITED STATES PATENTS
3,128,292  4/1964  Counsell et al. ____ 260—397.4
LEWIS GOTTS, *Primary Examiner.*
HENRY A. FRENCH, *Assistant Examiner.*